United States Patent [19]
Beharrell et al.

[11] 3,730,248
[45] May 1, 1973

[54] RIM FOR MOUNTING PNEUMATIC TIRES ON WHEELS

[76] Inventors: George David Beharrell, 153 Darridge Road, Solihull; George Edward Adams, 18 Villiers Road, Kenilworth, both of England

[22] Filed: Nov. 20, 1970

[21] Appl. No.: 91,265

Related U.S. Application Data

[62] Division of Ser. No. 595,746, Nov. 21, 1966, Pat. No. 3,588,981.

[52] U.S. Cl. ................................ 152/379, 301/11
[51] Int. Cl. .................................... B60c 5/16
[58] Field of Search ............... 152/383, 378, 379, 152/380, 381, 382; 29/159.01, 512; 301/11, 63 R

[56] References Cited

UNITED STATES PATENTS 1,387,797  8/1921  Miller .................... 152/383

FOREIGN PATENTS OR APPLICATIONS 794,779  5/1958  Great Britain

*Primary Examiner*—Gerald M. Forlenza
*Assistant Examiner*—Robert Saifer
*Attorney*—John A. Young

[57] ABSTRACT

A pneumatic tire and rim assembly is comprised of a one piece rim having an inwardly depressed well portion with a tire bead-retaining flange which is depressed inwardly to permit the pneumatic tire to pass over the depressed flange. After the tire is positioned the inwardly depressed well portion is expanded radially outwardly to bring the tire bead-retaining flange into supporting relation with the bead of the pneumatic tire.

2 Claims, 3 Drawing Figures

RIM FOR MOUNTING PNEUMATIC TIRES ON WHEELS

This application is a division application of U.S. application Ser. No. 595,746, filed Nov. 21, 1966, now U.S. Pat. No. 3,588,981 and entitled "AN IMPROVED METHOD FOR MOUNTING PNEUMATIC TIRES ON WHEELS."

This invention relates to vehicle wheels and is concerned with the provision of a tire and rim assembly comprising a pneumatic tire permanently secured to a metal rim which can be detachably secured to a wheel body.

Conventional single-piece rims for motor vehicle wheels are formed with a central inwardly depressed well portion to permit the mounting and dismounting of beaded pneumatic tires. The well portion limits the amount of space available within the rim in which the brake can be mounted, and in order to increase the size of brake drum or disc which can be accommodated in a wheel of a given rim diameter it is desirable to reduce in size or eliminate the well portion.

According to the invention, a method is provided for mounting a pneumatic tire on a metal rim having a pair of tire bead-retaining flanges projecting radially beyond the base of the rim and arranged by the provision of a well or other inwardly depressed portion to permit a pneumatic tire to be mounted thereon, said method comprising mounting a tire on the rim and subsequently deforming the rim to reduce or eliminate the radially inward projection of the inwardly depressed portion of the rim.

One method in accordance with the invention for mounting a pneumatic tire on a metal rim having a pair of tire bead-retaining flanges projecting radially outwardly beyond the base of the rim, one flange and the adjacent portion of the rim being depressed radially inwardly to permit the beads of a pneumatic tire to pass over the depressed flange, comprises mounting a pneumatic tire on the rim and expanding the depressed flange and the adjacent region of the rim to provide a bead seat to engage the associated bead of the tire.

According to the invention also, a pneumatic tire and rim assembly comprises a one-piece rim formed without an inwardly depressed well portion and having a pneumatic tire seated thereon.

The invention also provides a partly-shaped rim for incorporation into an assembly as defined above, said partly-shaped rim having in axial cross-section a flat base portion and having one tire bead-retaining flange depressed radially inwardly to permit the beads of a pneumatic tire to pass over the depressed flange.

The tire and rim assembly in accordance with the invention may be detachably secured to a pressed steel wheel body by means of inwardly projecting lugs fastened to the rim and arranged to be bolted to the wheel body. Alternatively, the tire and rim assembly may be provided with means engageable by a gripping member provided on a hub element as described in our copending British Pat. application No. 51,690/64.

Two alternative methods in accordance with the invention will now be described, by way of example, with reference to the accompanying drawings, in which.

Figure 1:
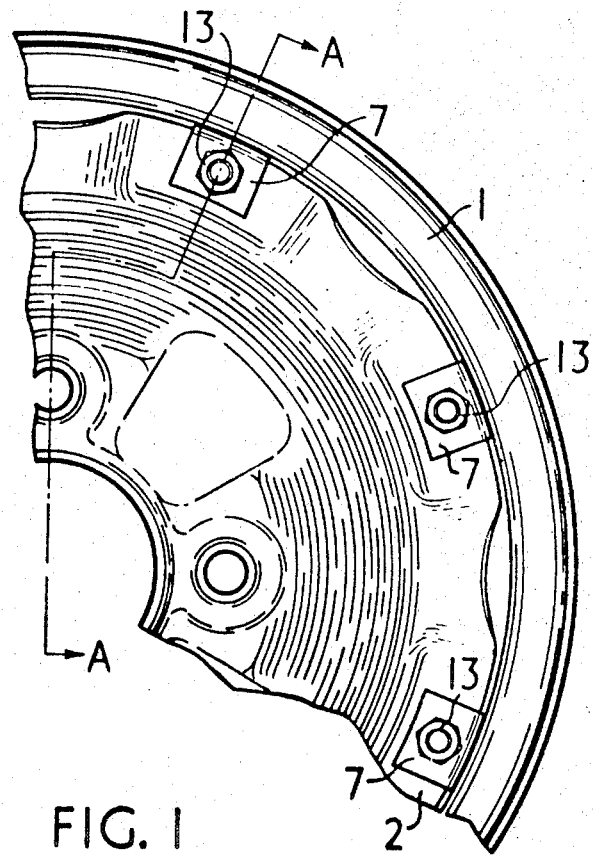
FIG. 1 is an elevation of part of a wheel, viewed in the axial direction.
Figure 2:
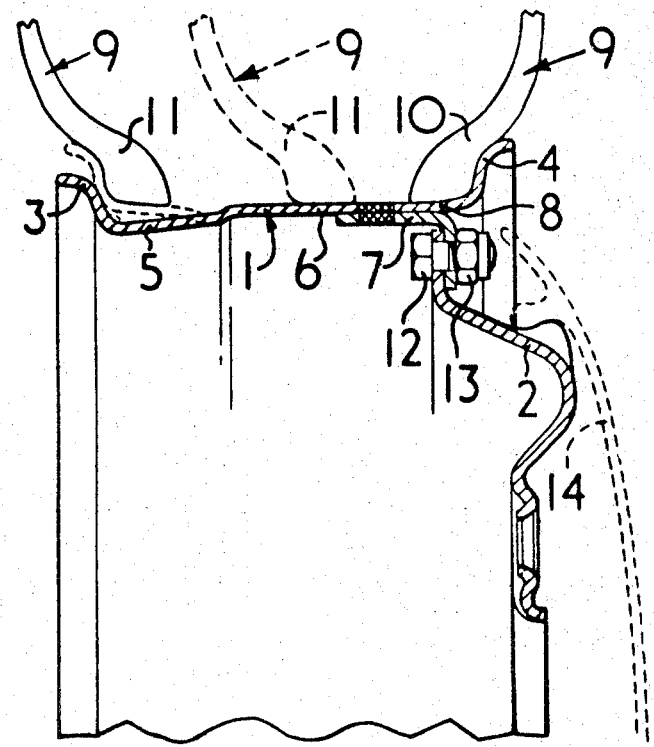
FIG. 2 is a cross-sectional view on the line A—A of FIG. 1, illustrating one method for mounting a pneumatic tire on the rim portion of the wheel.

In a preferred method as illustrated in FIG. 2, a flat-base rim 1 for mounting on a wheel body 2 is manufactured from sheet steel strip by a conventional rolling process, and is formed with radially outwardly projecting flanges 3 and 4. The flange 3, and the adjacent bead seating portion 5 of the rim base 6, is formed in the rolling process so that it is depressed radially inwardly in relation to the remainder of the rim.

Eight members of L-shaped cross-section are welded to the rim so as to provide inwardly extending lugs 7 in equally-spaced positions around the circumference of the rim and in a common plane with the center line of the bead seating portion 8 of the non-depressed part of the rim. The rim is also drilled to enable a tire inflation valve to be fitted in the usual manner.

A tubeless pneumatic tire 9 is then mounted on the rim, the bead 10 of the tire being seated on the bead-seating portion 8 and the bead 11 of the tire being in the position indicated in dotted lines in FIG. 2. The rim is placed on an expanding chuck or on an expanding roller device of conventional form which is operated to expand the depressed portion 5 of the rim radially outwardly to provide a bead seating portion 5 as indicated in dotted lines which subsequently or in the expanding process makes firm engagement with the associated tire bead.

Figure 3:
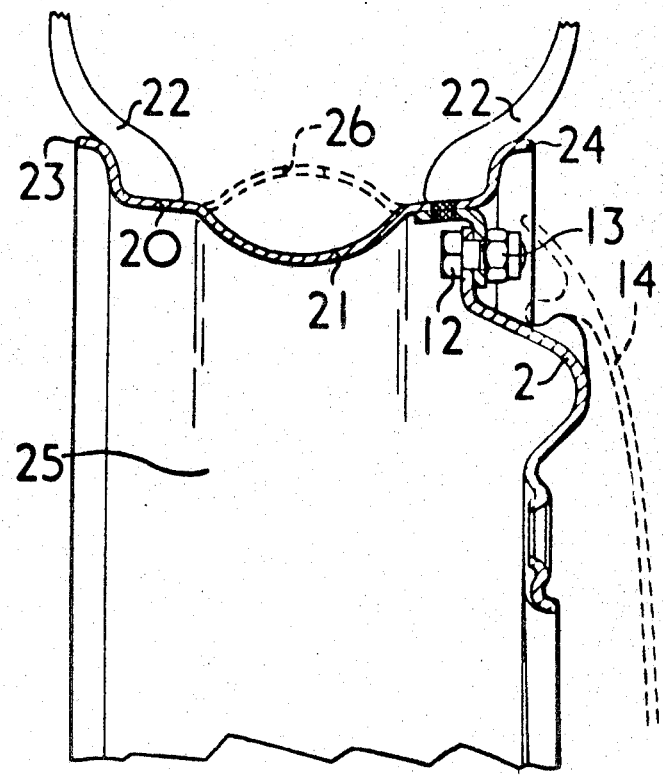
FIG. 3 is a similar view to FIG. 2, showing an alternative method.

The wheel body 2 is the same for the two arrangements illustrated in FIGS. 2 and 3, and is secured to the lugs 7 by bolts 12 and nuts 13, the nuts being concealed in the finished assembly by a detachable hub cap 14 shown in dotted lines in FIGS. 2 and 3.

In the alternative method shown in FIGS. 3 the rim 20 is formed with a central well portion 21, and the tire 22 is fitted in the normal manner. The tire and rim assembly thus produced is then mounted in a press (not shown) having a pair of disc-shaped plates which are provided with annular rubber sealing rings to engage the sides 23, 24 of the rim flanges and thus to provide a sealed chamber 25 bounded by the inner surface of the rim and the two plates.

Pneumatic pressure is then applied to the chamber 25 to cause the well portion of the rim to be expanded radially outwardly until, as shown in dotted lines in FIG. 3, it assumes a concave curvature viewed from the inside of the rim. In this method the valve hole 26 will be drilled after the expanding process, or alternatively may be temporarily sealed during this process.

Both of the methods described above provide a tire and rim assembly in which the usual well portion of the rim is completely eliminated, the tire being permanently secured to the rim.

The main advantage of this construction is that the saving of space within the rim enables a larger diameter brake to be fitted. Further advantages are, in the case of the embodiment described with reference to FIG. 2, that less material is required to form the rim, and the rolling process for manufacture of the rim is simplified since no well portion has to be formed. It is also possible, in the construction in accordance with the invention, to provide the body portion of the wheel with vent holes at a greater distance from the axis of the wheel, thus improving the cooling of the brake.

Having now described our invention, what we claim is:

1. In a pneumatic tire and rim assembly, an intermediary product in the assembling of the pneumatic tire and rim comprising a one piece rim having a base and laterally spaced first and second tire bead retaining flanges, said first tire bead retaining flange being depressed radially inwardly by an amount which is proportioned to permit the beads of a pneumatic tire to pass over said first depressed flange and into engagement with said second tire bead retaining flange which is disposed radially outwardly of said first flange, said first tire bead retaining flange being radially expandable while said pneumatic tire is in operative assembled relation relatively to said one piece rim whereby said one tire bead retaining flange is displaced outwardly and into engagement with the associated bead of the pneumatic tire, said pneumatic tire being mounted on said rim and having beads of equal diameter in sealing relation with both said second tire bead retaining flange and said expanded first tire bead retaining flange.

2. A pneumatic tire rim assembly according to claim 1 including a plurality of circumferentially spaced radially inwardly projecting lugs operatively secured to said rim and providing connections whereby said rim may be secured to a wheel body, said connection being located at one side of said rim to be in a non-interfering relation with said wheel portion.

* * * * *